(12) United States Patent
Yamamura et al.

(10) Patent No.: US 6,248,186 B1
(45) Date of Patent: Jun. 19, 2001

(54) BALL-AND-ROLLER BEARING AND METHOD OF MANUFACTURING THE SAME

(75) Inventors: Kenji Yamamura, Fujisawa; Susumu Tanaka, Yokohama; Manabu Ohori, Fujisawa, all of (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/341,161
(22) PCT Filed: Nov. 6, 1998
(86) PCT No.: PCT/JP98/05008
 § 371 Date: Jul. 2, 1999
 § 102(e) Date: Jul. 2, 1999
(87) PCT Pub. No.: WO99/24728
 PCT Pub. Date: May 20, 1999

(30) Foreign Application Priority Data

Nov. 7, 1997 (JP) .................................................. 9-305845

(51) Int. Cl.[7] .............................. C21D 1/06; C22C 38/44; C22C 38/52; C22C 38/22; C22C 8/22
(52) U.S. Cl. ........................ 148/319; 148/906; 148/218; 148/225; 148/326; 148/328; 148/607; 148/622; 384/492; 384/912
(58) Field of Search ..................................... 148/906, 319, 148/218, 225, 326, 328, 607, 622; 384/492, 912

(56) References Cited

U.S. PATENT DOCUMENTS 5,560,787 * 10/1996 Takagi et al. ........................ 148/906

* cited by examiner

Primary Examiner—Deborah Yee
(74) Attorney, Agent, or Firm—Christensen O'Connor Johnson Kindness PLLC

(57) ABSTRACT

A ball-and-roller bearing is disclosed having an inner ring, an outer ring arranged on the axis of the inner ring and rotating around the co-axis relative to the inner ring, and a rolling body interposed between the inner ring and the outer ring and rolling with rotation of the outer ring relative to the inner ring. One of the inner ring, the outer ring, and the rolling body has a core member made from an alloy containing iron, at least one of 0.2 to 1.0% by weight of silicon and 0.2 to 1.5% by weight of manganese, 7.0 to 11.0% by weight of chromium, 1.5 to 6.0% by weight of molybdenum, and 0.5 to 8.0% by weight of cobalt, and a case hardened surface layer. Also disclosed is the method of manufacturing the bearing by forming a core member of the alloy, forming a case hardened layer containing 0.9 to 1.5% by weight of carbon in a surface region of the core member by applying to the core member a carbonizing or carbonitriding treatment, a hardening treatment, and a tempering treatment under high temperatures, and assembling the inner ring, the outer ring and the rolling body such that the inner ring and the outer ring are positioned on the same axis and the rolling body is between the inner ring and the outer ring.

11 Claims, 3 Drawing Sheets

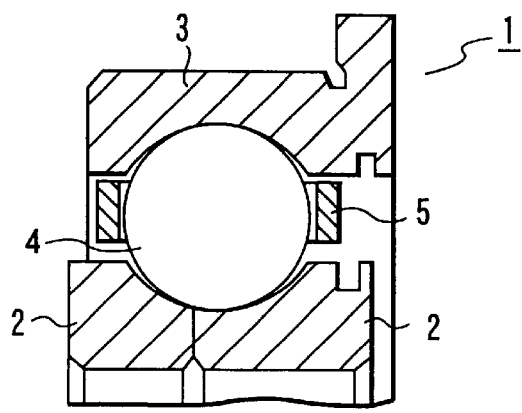
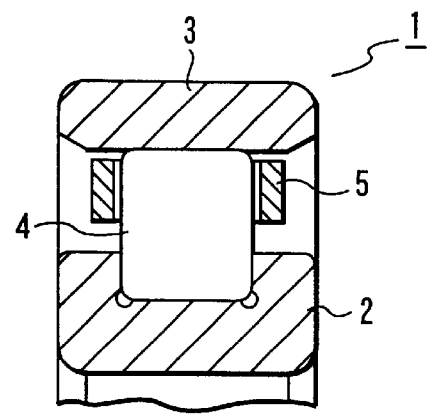
FIG. 1  FIG. 2
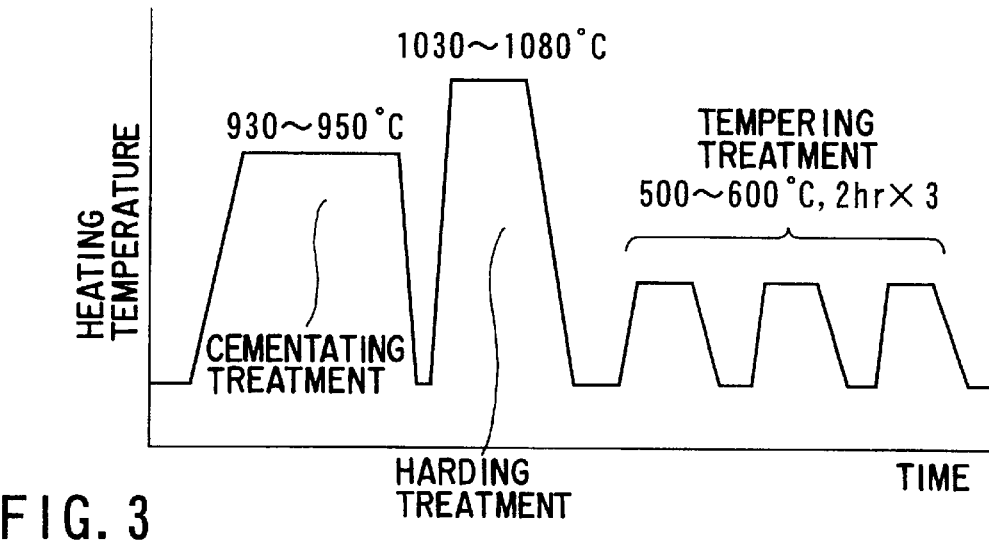
FIG. 3
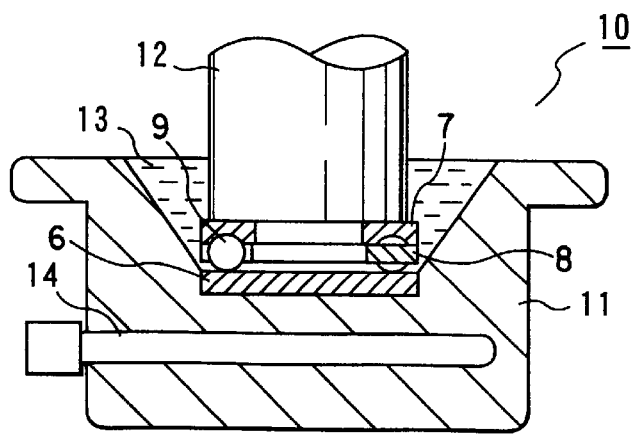
FIG. 4

BALL-AND-ROLLER BEARING AND METHOD OF MANUFACTURING THE SAME

TECHNICAL FIELD

The present invention relates to a ball-and-roller bearing and a method of manufacturing the same, particularly to a ball-and-roller bearing used in, for example, an aircraft and a method of manufacturing the same.

BACKGROUND ART

A high mechanical strength is required for a ball-and-roller bearing used under conditions of a high temperature and a high rotating speed like the ball-and-roller bearing used in an engine of an aircraft. Particularly, since only a slight damage done to a member is likely to bring about a serious accident in an aircraft, a very high mechanical strength and reliability is required for the ball-and-roller bearing for an aircraft.

For the same reasons, the ball-and-roller bearing for an aircraft is judged in general to have reached the life at the time when only a slight rust has been formed. Such being the situation, the ball-and-roller bearing for an aircraft is required to exhibit not only a high mechanical strength but also an excellent corrosion resistance.

It was customary to use a semihice series materials of AISI M50, M50NiL, etc. for forming the ball-and-roller bearing for an aircraft. The ball-and-roller bearing for an aircraft that is made of these materials exhibits a relatively high mechanical strength. However, in these materials, a content of chromium that is said to be most effective for improving the corrosion resistance of the steel is low.

In general, an airport is constructed near the coast, since the airport requires a tremendously large site and serious noises are generated by the aircraft around the airport. What should be noted is that the ball-and-roller bearing for an aircraft is used or stored under the environment in which rust tends to be caused by salt.

In the ball-and-roller bearing for an aircraft that is made of the semihice series material, the problem derived from the rust is not so serious in respect of the rolling body. This is because the rolling body has a small surface area, compared with other members. In addition, the most portion of the surface is brought into a rolling or sliding contact with other members. However, each of the inner ring and the outer ring has a large surface area, and the most portion of the surface is not brought into a rolling or sliding contact with other members. In addition, the ball-and-roller bearing for an aircraft including an inner ring or an outer ring made of the material described above fails to exhibit a sufficiently high corrosion resistance.

A martensite series stainless steel such as SUS440C is known to be suitable for use as a material of the ball-and-roller bearing excellent in corrosion resistance. However, in the case of using a martensite series stainless steel for forming the ball-and-roller bearing for an aircraft, coarse eutectic carbide particles are formed in the inner ring, outer ring, etc. As a result, it is not possible to obtain a hardness high enough to be used satisfactorily under the particularly severe conditions of a high temperature and a high rotating speed. Under the circumstances, it is important to improve further the rolling fatigue life characteristics of the ball-and-roller bearing.

DISCLOSURE OF INVENTION

The present invention, which has been achieved in view of the above-noted problems inherent in the prior art, is intended to provide a ball-and-roller bearing excellent in mechanical characteristics and corrosion resistance and a method of manufacturing the same.

According to the present invention, there is provided a ball-and-roller bearing, comprising an inner ring, an outer ring arranged on the co-axis of the inner ring and rotating around the axis relative to the inner ring, and a rolling body interposed between the inner ring and the outer ring and rolling on the inner ring and the outer ring in accordance with rotation of the outer ring relative to the inner ring, wherein at least one member selected from the group consisting of the inner ring, the outer ring, and the rolling body comprises a core member consisting essentially of an alloy containing iron, at least one of 0.2 to 1.0% by weight of silicon and 0.2 to 1.5% by weight of manganese, 7.0 to 11.0% by weight of chromium, 1.5 to 6.0% by weight of molybdenum, and 0.5 to 8.0% by weight of cobalt, and a case hardened layer formed by subjecting a surface region of the core member to a secondary hardening treatment and containing 0.9 to 1.5% by weight of carbon.

The present invention also provides a method of manufacturing a ball-and-roller bearing, comprising the steps of forming a core member consisting essentially of an alloy containing iron, at least one of 0.2 to 1.0% by weight of silicon and 0.2 to 1.5% by weight of manganese, 7.0 to 11.0% by weight of chromium, 1.5 to 6.0% by weight of molybdenum, and 0.5 to 8.0% by weight of cobalt, forming a case hardened layer containing 0.9 to 1.5% by weight of carbon in a surface region of the core member by applying to the core member a carborizing or carbonitriding treatment, a hardening treatment, and a tempering treatment under high temperatures in the order mentioned, and assembling an inner ring, an outer ring and a rolling body such that the inner ring and the outer ring are positioned on the same axis and that the rolling body is interposed between the inner ring and the outer ring, at least one of the inner ring, the outer ring, and the rolling body being formed of the core member having the case hardened layer formed on the surface.

BRIEF DESCRIPTION OF DRAWINGS

FIG. 1 is a cross sectional view schematically showing a ball-and-roller bearing according to one embodiment of the present invention;

FIG. 2 is a cross sectional view schematically showing a ball-and-roller bearing according to another embodiment of the present invention;

FIG. 3 is a graph showing the conditions of the heat treatment applied to ball-and-roller bearings according to an example of the present invention and a comparative example;

FIG. 4 is a cross sectional view schematically showing a thrust type life tester used for measuring the rolling fatigue life of a ball-and-roller bearing according to the example of the present invention;

BEST MODE OF CARRYING OUT THE INVENTION

Figure 5:
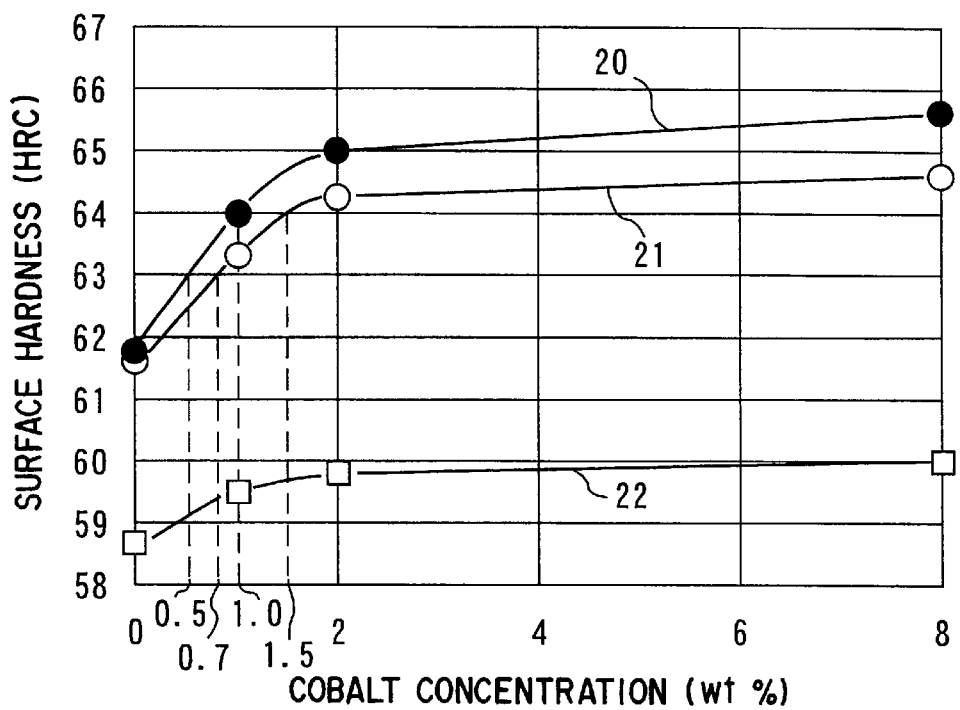
FIG. 5 is a graph showing the relationship between the cobalt concentration of steel in a case hardened bearing steel and the surface hardness.

A ball-and-roller bearing of the present invention will now be described in detail with reference to the accompanying drawings.

FIG. 1 is a cross sectional view schematically showing a ball-and-roller bearing according to one embodiment of the present invention. Also, FIG. 2 is a cross sectional view schematically showing a ball-and-roller bearing according to another embodiment of the present invention. A ball-and-roller bearing 1 shown in each of FIGS. 1 and 2 is constructed mainly of an inner ring 2, an outer ring 3 arranged on the axis of the inner ring 2, and a rolling body 4 interposed between the inner ring 2 and the outer ring 3. Note that the reference numeral 5 denotes a holder for holding the rolling body 4.

In general, a groove-like track is formed on each of the mutually facing surfaces of the inner ring 2 and the outer ring 3. The rolling body 4 is rolled along the tracks in accordance with rotation of the inner ring 2 relative to the outer ring 3.

The shapes of the inner ring 2 and the outer ring 3 included in the ball-and-roller bearing 1 of the present invention are not particularly limited. It is possible for these inner ring 2 and outer ring 3 to be shaped like the inner and outer rings used in the general ball-and-roller bearing. At least one of the inner ring 2 and the outer ring 3 may be divided into two parts along a plane perpendicular to the rotary axis, as shown in FIG. 1. It is possible for the inner ring 2 to be formed integral with the shaft supported by the ball-and-roller bearing 1. The rolling body 4 may be shaped like the rolling body used in the ordinary ball-and-roller bearing. For example, the rolling body 4 may be shaped like a ball as shown in FIG. 1 or like a roll as shown in FIG. 2.

In the ball-and-roller bearing 1 of the present invention, at least one of the inner ring 2, the outer ring 3 and the rolling body 4 is formed by molding an alloy of a predetermined composition into a desired shape, followed by applying a cementating or carbonitriding treatment to the molded article and subsequently applying a hardening treatment and a tempering treatment to the molded article in the order mentioned. As a result, the surface region of the molded articles is secondary hardened, with the result that a case hardened layer is formed on the molded article. On the other hand, the alloy composition is retained in the core portion of the molded article. The ball-and-roller bearing 1 of the present invention is featured in that at least one of the inner ring 2, the outer 3 and the rolling body 4 is formed of a case hardened bearing steel constituted by the core member consisting of the alloy described above and the case hardened layer formed in the surface region of the core member. The case hardened bearing steel will now be described.

In the ball-and-roller bearing 1 of the present invention, the alloy used as a material of the case hardened bearing steel contains iron as a main component. In addition, at least one of silicon and manganese, cobalt, chromium and molybdenum are contained in the alloy together with iron.

Used in the ball-and-roller bearing 1 of the present invention is a case hardened bearing steel having a case hardened layer containing a high concentration of carbon and a core portion in which the carbon concentration is suppressed at a low level. In general, the carbon addition to an alloy permits formation of a carbide so as to convert the texture of the base material into martensite texture, thereby to increase the mechanical strength of the base material. It follows that, in the case of using such a case hardened bearing steel, it is possible to obtain a surface hardness high enough to withstand the severe rolling or sliding contact with another member. Also, where the carbon concentration is suppressed at a low level in the core portion, a high mechanical strength (fracture toughness) can be obtained in the core portion. It follows that the ball-and-roller bearing 1 of the present invention is capable of absorbing a strong impact, even if applied, and, thus, fracture is unlikely to take place.

A major portion of the carbon atoms or nitrogen atoms contained in the case hardened layer is supplied by the cementating or carbonitriding treatment applied to the molded article which is obtained by molding alloy into a desired shape. It follows that the carbon concentration in the core portion can be suppressed at a low level by using an alloy having a very low carbon concentration. In other words, it is possible to increase the fracture toughness of the core portion.

Where the carbon content of the alloy is 0.2% by weight or less, a low carbon concentration can be retained in the core portion of the case hardened bearing steel, making it possible to suppress the hardness of the core portion at a sufficiently low level. Particularly, where the carbon content of the alloy is 0.15% by weight or less, the hardness of the core portion can be suppressed at a very low level. It should be noted that the composition of the core portion of the molded article before formation of the case hardened layer is left substantially unchanged after formation of the case hardened layer. In other words, the composition of the core portion is considered to be equal to the composition of the alloy used as a raw material of the case hardened bearing steel.

The alloy used in the present invention contains at least one of 0.2 to 1.0% by weight of silicon and 0.2 to 1.5% by weight of manganese. Silicon is used as a deoxidizer. A sufficient deoxidizing effect can be obtained, if silicon is added in an amount of about 0.2% by weight. However, if silicon is added in an amount exceeding 1.0% by weight, the cementating and forging properties of the alloy tend to be impaired. Manganese is also used as a deoxidizer. A sufficient deoxidizing effect can be obtained, if manganese is added in an amount of about 0.2% by weight. Manganese also serves to improve the hardenability of the alloy. If manganese is added in an amount exceeding 1.5% by weight, however, the toughness of the case hardened bearing steel tends to be impaired.

The alloy used in the present invention also contains 7.0 to 11.0% by weight of chromium. As described previously, a high corrosion resistance is required in the ball-and-roller bearing used in, for example, an aircraft. Chromium is most adapted for imparting a corrosion resistance to steel. A sufficient corrosion resistance can be obtained by adding about 7.0% by weight of chromium to the alloy. Particularly, a more satisfactory corrosion resistance can be obtained in the case of adding 8% by weight or more of chromium. It should also be noted that, where chromium is contained in the alloy, carbides such as $Cr_{23}C_6$ and $Cr_7C$ are formed in the hardening step so as to increase the hardness. Further, where the chromium concentration is set at 11% by weight or less, seizing is less likely to take place even in the case where the bearing is used under conditions of a high temperature and a high rotating speed like the ball-and-roller bearing for an aircraft. Also, in this case, δ-ferrite is unlikely to be precipitated, making it possible to suppress reduction in the fracture toughness of the core portion. Particularly, where the chromium concentration is set at 10% by weight or less, the seizing occurrence and the reduction in the fracture toughness of the core portion can be suppressed more effectively.

The alloy used in the present invention also contains 1.5 to 6.0% by weight of molybdenum and 0.5 to 8.0% by weight of cobalt. Each of molybdenum and cobalt is required for the secondary hardening. To be more specific, molybdenum and cobalt form carbides or intermetallic compounds in the surface region in the tempering step carried out at high temperatures. The carbides precipitated in the tempering treatment under high temperatures have a chemical structure represented by a general formula "$M_6C$", where M represents molybdenum and cobalt. The general formula indicates that the sum of the number of molybdenum atoms and the number of cobalt atoms is 6 times as large as the number of carbon atoms.

These carbides and the intermetallic compounds formed by molybdenum and cobalt form very fine crystal grains of submicron order. It follows that, by adding molybdenum and cobalt to the alloy, the hardness of the case hardened layer can be retained at a very high level even under high temperatures. Also, where molybdenum is added to the alloy, the corrosion resistance of the alloy can be improved. These effects can be obtained where the alloy contains 1.5% by weight or more of molybdenum. Also, these effects are rendered prominently high where the alloy contains 2.0% by weight or more of molybdenum. However, if molybdenum is added in an amount exceeding 6.0% by weight, decarbonization and demolybdenization tend to take place easily. Also, the toughness is likely to be lowered.

Cobalt also produces the effects described above. In addition, cobalt serves to prevent formation of δ-ferrite so as to obtain a high toughness. Further, cobalt forms a solid solution with iron so as to increase the amount of carbon contained in the alloy in the form of a solid solution. It follows that the hardness under high temperatures can be increased. These effects can be obtained in the case of adding cobalt in an amount of 0.5% by weight or more and can be made more prominent in the case where cobalt is contained in an amount of 2.0% by weight or more. However, if the cobalt content of the alloy exceeds 8.0% by weight, the toughness of the alloy tends to be lowered.

It is desirable for the alloy used in the present invention to contain vanadium in an amount of 0.1 to 1.0% by weight. Vanadium serves to increase the softening resistance in the tempering step and to form a carbide having a chemical formula VC, which has a high hardness, in the hardening step. Where vanadium is added in an amount of 0.1% by weight or more, the hardness of the alloy under high temperatures is increased so as to increase the abrasion resistance. However, if the vanadium content of the alloy exceeds 1.0% by weight, the toughness of the alloy tends to be lowered.

It is also desirable for the alloy used in the present invention to contain nickel in an amount of 1.0 to 5.0% by weight. Where the alloy contains 1.0% by weight or more of nickel, δ-ferrite formation can be prevented so as to obtain a high toughness, as in the case of adding cobalt to the alloy. However, if nickel is added in an amount exceeding 5.0% by weight, the A1 critical temperature is lowered so as to increase the annealing hardness. It follows that the machinability of the alloy tends to be lowered. It is more desirable for the nickel content of the alloy to be 3.0% by weight or less. In this case, the reduction in the machinability can be prevented satisfactorily.

The alloy used for forming the ball-and-roller bearing 1 of the present invention may also contain traces of impurities in addition to the additive elements described above. These impurities include, for example, phosphorus, sulfur and oxygen.

The case hardened bearing steel used in the ball-and-roller bearing 1 of the present invention can be obtained by applying a cementating or carbonitriding treatment to the alloy described above, followed by a hardening treatment and subsequently a tempering treatment under high temperatures. A case hardened layer exhibiting a high hardness even under high temperatures can be formed by these treatments, making it possible to improve the rolling fatigue life characteristics. Incidentally, the term "case hardened layer" used herein represents a surface region of the member made of the case hardened bearing steel. The thickness of the case hardened layer is defined to be 2% of the diameter of the rolling body.

In the ball-and-roller bearing 1 of the present invention, at least one of the inner ring 2, the outer ring 3 and the rolling body 4 is formed of the case hardened bearing steel described above. It follows that the bearing 1 of the present invention exhibits an excellent corrosion resistance and an excellent mechanical strength.

The inner ring 2, the outer ring 3 or the rolling body 4 consisting of the case hardened bearing steel can be manufactured, for example, as follows. In the first step, a molded article of a predetermined shape is prepared by using the alloy described above. Then, a cementating treatment or a carbonitriding treatment, a hardening treatment, and a tempering treatment under high temperatures are applied in the order mentioned to the molded article. As a result, a case hardened layer is formed in a surface region of the molded article, with the composition of the core portion of the molded article before these treatments left unchanged. Then, a finish treatment such as grinding is applied, if necessary, to the molded article. Any of the inner ring 2, the outer ring 3 and the rolling body 4 consisting of the case hardened bearing steel can be manufactured in this fashion.

The inner ring 2 or the like thus manufactured has a case hardened layer in the surface region. What should be noted is that, in the ball-and-roller bearing 1 of the present invention, those portions of the rolling body 4, the inner ring 2 and the outer ring 3 which are brought into a rolling or sliding contact with other members of the bearing 1 are formed of the case hardened layers, with the result that the ball-and-roller bearing 1 of the present invention exhibits an excellent mechanical strength. Further, the state of the core portion before formation of the case hardened layer is left unchanged after formation of the case hardened layer, making it possible to achieve a high fracture toughness.

In the ball-and-roller bearing 1 of the present invention, the case hardened layer contains carbon. As described previously, where the alloy contains carbon, carbides are formed within the alloy together with other additives such as molybdenum, cobalt, chromium or vanadium so as to further increase the hardness of the alloy. Particularly, the carbides of molybdenum and cobalt form very fine crystal grains of submicron order, with the result that the hardness of the case hardened layer is kept at a very high level even if the bearing 1 is used under severe conditions such as a high temperature and a high rotating speed. It should also be noted that, where the alloy contains carbon, some of the carbon atoms forms a solid solution within the alloy so as to increase the hardness of the rolling and sliding contact surface.

In the ball-and-roller bearing 1 of the present invention, the carbon concentration in the case hardened layer is controlled at 0.9 to 1.5% by weight. Where the carbon concentration in the case hardened layer is 0.9% by weight or more, it is possible to form a case hardened layer having a sufficient hardness, making it possible to obtain a high abrasion resistance and satisfactory rolling fatigue life characteristics even if the bearing 1 is used under severe conditions such as a high temperature and a high rotating speed. However, if the carbon concentration in the case hardened layer exceeds 1.5% by weight, cementite that is an iron carbide is formed in the shape of coarse meshes. The coarse cementite can be a start point of crack, with the result that the rolling fatigue life of the bearing 1 tends to be shortened. The shortening of the rolling fatigue life can be prevented by setting the carbon concentration in the case hardened layer at 1.5% by weight or less. Particularly, where the carbon concentration in the case hardened layer is set at 1.2% by weight or less, the shortening of the rolling fatigue life can be prevented more effectively.

Incidentally, if the carbon concentration in the case hardened layer is increased, the corrosion resistance is lowered. However, the present inventors have found that, if the carbon concentration in the case hardened layer is not higher than 1.5% by weight, it is possible to obtain a corrosion resistance as well as or better than that of the bearing prepared by using the conventional material of martensite series stainless steel.

As described previously, the case hardened layer is defined in the present invention to represent a surface region of the member made of a case hardened bearing steel and to have a thickness equal to 2% of the diameter of the rolling body. The thickness of the case hardened layer is defined to be 2% of the diameter of the rolling body because the prominent effects of the present invention described above can be obtained if the thickness of the surface region having a carbon concentration of 0.9 to 1.5% by weight is at least 2% of the diameter of the rolling body. Incidentally, where the member made of the case hardened bearing steel is manufactured by the method described previously, it is substantially impossible for the surface region having a carbon concentration of 0.9 to 1.5% by weight to be formed in an excessively large thickness. The largest thickness of the case hardened layer that can be formed is about 2 mm.

Some examples of the present invention will now be described.

Specifically, the ball-and-roller bearing 1 shown in FIG. 1 was manufactured as follows. In the first step, each of the alloys having the compositions as shown in Table 1 was molded to prepare molded articles of the shapes corresponding to the inner ring 2, the outer ring 3 and the balls (rolling bodies) 4. Then, heat treatments similar to those applied to a test piece, which are described herein later, were applied to these molded articles to prepare the inner ring 2, the outer ring 3 and the balls 4. Further, these inner ring 2, outer ring 3 and balls 4 were assembled to manufacture the ball-and-roller bearing 1. The ball-and-roller bearings 1 thus manufactured are given in Table 1 as samples Nos. (1) to (21).

TABLE 1

| Sample | Concentration in alloy (% by weight) | | | | | | | |
|---|---|---|---|---|---|---|---|---|
| | C | Si | Mn | Cr | Mo | V | Co | Ni |
| (1) | 0.04 | 0.31 | 0.50 | 7.0 | 3.5 | 0.38 | 3.0 | 2.0 |
| (2) | 0.08 | 0.27 | 0.45 | 8.0 | 4.5 | — | 3.5 | — |
| (3) | 0.04 | 0.30 | 1.50 | 9.0 | 3.9 | 0.42 | 4.8 | 1.5 |
| (4) | 0.07 | 0.28 | 0.27 | 9.0 | 4.9 | 0.10 | 5.1 | 1.3 |
| (5) | 0.03 | 0.28 | 0.31 | 9.1 | 5.1 | 0.12 | 4.9 | 1.2 |
| (6) | 0.04 | 0.20 | 0.51 | 9.2 | 6.0 | 0.11 | 2.6 | 4.0 |
| (7) | 0.08 | 0.24 | 0.28 | 9.0 | 3.2 | — | 2.1 | 1.3 |
| (8) | 0.07 | 0.28 | 0.30 | 9.1 | 3.0 | 0.10 | 2.0 | 1.3 |
| (9) | 0.07 | 0.25 | 0.27 | 9.0 | 3.1 | 0.30 | 2.5 | 1.5 |
| (10) | 0.02 | 0.25 | 0.32 | 9.5 | 2.0 | 0.32 | 8.0 | 1.0 |
| (11) | 0.11 | 0.35 | 0.28 | 8.9 | 4.9 | 0.11 | 5.0 | 1.3 |

TABLE 1-continued

| Sample | Concentration in alloy (% by weight) | | | | | | | |
|---|---|---|---|---|---|---|---|---|
| | C | Si | Mn | Cr | Mo | V | Co | Ni |
| (12) | 0.20 | 0.28 | 0.31 | 9.3 | 3.3 | 0.30 | 1.5 | 1.1 |
| (13) | 0.02 | 0.25 | 0.55 | 9.5 | 3.0 | 1.00 | 3.2 | 5.0 |
| (14) | 0.08 | 0.24 | 0.38 | 10.0 | 3.1 | 0.32 | 4.8 | 2.1 |
| (15) | 0.06 | 0.30 | 0.35 | 11.0 | 3.2 | 0.43 | 3.5 | 2.5 |
| (16) | 0.08 | 0.28 | 0.32 | 12.8 | 3.1 | 0.11 | 4.2 | 1.7 |
| (17) | 0.07 | 0.27 | 0.32 | 6.0 | 3.0 | 0.32 | 3.2 | 1.5 |
| (18) | 0.07 | 0.25 | 0.27 | 9.0 | 3.1 | 0.30 | 2.5 | 1.5 |
| (19) | 0.07 | 0.25 | 0.27 | 9.0 | 3.1 | 0.30 | 2.5 | 1.5 |
| (20) | 0.07 | 0.28 | 0.31 | 9.1 | 1.5 | 0.40 | 3.4 | 1.3 |
| (21) | 0.83 | 0.23 | 0.31 | 4.1 | 4.2 | 0.99 | — | — |

In Table 1, the amounts of the elements added to iron are denoted by "% by weight" to the alloy. Samples (1) to (15) given in Table 1 represent ball-and-roller bearings according to the examples of the present invention. On the other hand, samples (16) to (20) represent ball-and-roller bearings for comparative examples. Further, sample (21) represents the conventional ball-and-roller bearing.

In order to examine the rolling fatigue life and the corrosion resistance of these samples (1) to (21), test pieces were prepared by using the alloys of the compositions shown in Table 1, and heat treatments were applied to these test pieces under the conditions equal to those under which the heat treatments were applied to the samples (1) to (21). The test piece used for the rolling fatigue life test was sized at 60 mm in outer diameter, 5.5 mm in inner diameter, and 6 mm in thickness. On the other hand, the test piece used for the corrosion resistance test was sized at 20 mm in outer diameter and 10 mm in thickness. A cutting operation was applied as a finishing treatment to each of the test pieces after the heat treatments so as to obtain test pieces of a predetermined shape and size. Further, a lapping treatment was applied to the test surface of the test piece for the rolling fatigue life test.

Heat treatments were applied during preparation of the test pieces under the conditions given below.

Specifically, the test pieces of the compositions equal to those of the alloys used for forming samples (1) to (20) were prepared by applying heat treatments under the temperature conditions shown in FIG. 3, which is a graph showing the heat treating conditions of the alloys used for forming the ball-and-roller bearings according to the examples of the present invention and comparatives examples. In the graph of FIG. 3, the time (arbitrary unit) is plotted on the abscissa, with the heating temperature being plotted on the ordinate. As shown in the graph, the case hardened bearing steel used for preparing samples (1) to (20) was subjected to a cementating treatment under vacuum at 930 to 950° C., followed by temporarily cooling the samples and subsequently applying a hardening treatment to the bearing steel at 1030 to 1080° C. Further, a tempering treatment was applied at 500 to 600° C. for 2 hours to the bearing steel. The tempering treatment was applied three times so as to achieve a secondary hardening.

As shown in Table 1, the alloys used preparing samples (9), (18) and (19) were equal to each other in composition. However, these samples (9), (18) and (19) differed from each other in the carbon concentration in the case hardened layer, as shown in Table 2. The carbon concentration in the case hardened layer was controlled by controlling appropriately the time for the vacuum cementating treatment, the heating time before the hardening treatment, etc.

The test piece of the composition equal to that of the alloy used for preparing sample (21) was hardened at 1130° C., followed by applying a tempering treatment to the test piece at 550° C. for 2 hours, the tempering treatment being applied three times. Incidentally, a conventional alloy of AISI M50, which is widely used for preparing a ball-and-roller bearing for an aircraft, was used for preparing sample (21).

The rolling fatigue life and the corrosion resistance were measured by using the test pieces thus prepared for testing the rolling fatigue life and for testing the corrosion resistance. A testing machine shown in FIG. 4 was used for measuring the rolling fatigue life.

Specifically, FIG. 4 is a cross sectional view schematically showing a thrust type life testing machine used for measuring the rolling fatigue life of the ball-and-roller bearing 1 according to the examples of the present invention.

As shown in FIG. 4, the testing machine includes a housing 11. A truncated cone-shaped recess having a bottom smaller than the upper opening is formed in an upper portion of the housing 11. Also, a test piece 6 for testing the rolling fatigue life is fixed to the bottom of the recess. A rotary shaft 12 having an inner ring 7 fixed to the tip is arranged above the test piece 6. Balls 9 held by a holder 8 are interposed between the inner ring 7 and the test piece 6. The balls 9 are rolled along the upper surface of the test piece 6 in accordance with rotation of the rotary shaft 12. It should be noted that the inner ring 7 and the holder 8 shown in FIG. 4 are what are used for the life test and, thus, differ in construction from the inner ring and the holder actually used in a ball-and-roller bearing used in, for example, an aircraft. Also, the balls 9 were made of AISI M50. Where the balls 9 were deteriorated during the test, new balls were promptly substituted for the deteriorated ball.

The recess of the housing 11 is filled with a lubricating oil 13, which is supplied to the surfaces of the test piece 6, the inner ring 7, the balls 9 and the holder 8. A heater 14 is buried in a bottom portion of the housing 11 so as to heat the lubricating oil 13 through the housing 11.

The thrust type life testing machine of the particular construction described above makes it possible to reproduce various conditions of use of the bearing by changing the rotating speed of the rotary shaft 12, the axial load applied from the rotary shaft 12 to the test piece 6, the temperature of the lubricating oil, etc. In this experiment, a powdery steel was added as a foreign matter to the lubricating oil 13, and the rolling fatigue test was conducted under the conditions given below:

Load applied to the test piece: $P_{max}$=5.5 GPa;
Rotary shaft: 1000 rpm;
Lubricating oil: $R_O150$ (142 cSt/40° C.);
Lubricating oil temperature: 130° C.

The rolling fatigue test was applied to 15 samples for each test piece. A Weibull plot was prepared by using as the life value the number of repetitions of the stress application until peeling occurred on the surface of the test piece, and $L_{10}$ life of each of the test pieces was obtained from the result of the Weibull distribution.

For conducting the corrosion resistance test, the test piece for the corrosion resistance test was kept dipped for 24 hours in a city water of room temperature, and the corrosion resistance was evaluated by observing the rust occurrence on the test piece after dipping in the city water.

The results of the rolling fatigue test and the corrosion resistance test are shown in Table 2 together with the surface hardness of each of the test pieces.

TABLE 2

| Sample | Carbon concentration in case hardened layer (wt %) | Surface hardness (HRC) | Rolling fatigue life (×10⁶ Stress Cycle) | Corrosion resistance |
|---|---|---|---|---|
| (1) | 1.02 | 64.2 | 8.9 | ○ |
| (2) | 0.95 | 65.1 | 9.2 | ○ |
| (3) | 1.16 | 65.0 | 10.1 | ○ |
| (4) | 1.45 | 65.5 | 11.0 | ○ |
| (5) | 1.11 | 65.7 | 10.3 | ○ |
| (6) | 0.90 | 66.8 | 12.1 | ○ |
| (7) | 1.50 | 64.2 | 9.7 | ○ |
| (8) | 1.35 | 64.3 | 9.5 | ○ |
| (9) | 1.27 | 64.5 | 9.8 | ○ |
| (10) | 1.07 | 64.1 | 9.3 | ○ |
| (11) | 1.24 | 66.2 | 11.8 | ○ |
| (12) | 1.33 | 64.3 | 9.1 | ○ |
| (13) | 1.41 | 64.2 | 9.5 | ○ |
| (14) | 1.22 | 64.5 | 9.6 | ○ |
| (15) | 1.36 | 64.8 | 10.2 | ○ |
| (16) | 1.42 | 64.6 | 3.6 | ○ |
| (17) | 1.33 | 64.2 | 8.5 | X |
| (18) | 0.79 | 62.2 | 2.4 | ○ |
| (19) | 1.78 | 64.8 | 3.8 | ○ |
| (20) | 1.31 | 61.8 | 2.1 | ○ |
| (21) | 0.76 | 62.7 | 2.4 | X |

Mark "X" shown in Table 2 denotes that rust was recognized in the sample. Also, mark "○" represents that rust was not recognized in the sample. The samples marked "○" are considered to exhibit corrosion resistance equal to or higher than that of the sample prepared by using SUS440C, which is a conventional martensite series stainless steel.

As shown in Table 2, samples (18), (20) and (21) were found to be low in the surface hardness. On the other hand, samples (1) to (15) according to the examples of the present invention exhibited a high surface hardness, i.e., HRC of 64 or more.

As described previously, samples (1) to (15) were obtained by applying a hardening treatment at a low temperature, i.e., 1100° C. or lower, and a secondary hardening treatment at 500° C. or higher. On the other hand, in order to obtain a sufficiently high surface hardness by a secondary hardening treatment in the case of using the conventional semihice series material, it is necessary to apply a hardening treatment at a high temperature exceeding 1100° C. It should also be noted that the surface hardness is lowered, if a tempering treatment is carried out at a high temperature exceeding 450° C. in the case of using a stainless steel series material. As apparent from the experimental data given in Table 2, in samples (1) to (15) according to the examples of the present invention, the hardening treatment can be carried out at a temperature lower than that in the comparative examples and the sample of the conventional material. In addition, it is possible to obtain a surface hardness higher than that of the comparative examples and the sample of the conventional material.

When it comes to the rolling fatigue life, the $L_{10}$ life for each of samples (1) to (15) was found to be longer than that of any of samples (16) to (21). Particularly, samples (1) to (15) according to the examples of the present invention were found to exhibit a rolling fatigue life at least 3 times as long as that of any of samples (16) and (18) to (20) according to the comparative examples, and sample (21) of the conventional material. What should also be noted is that an inconvenience such as crack occurrence, which is derived from an insufficient toughness of the core portion, was not recognized at all in samples (1) to (15) during the rolling fatigue life test.

The samples according to the examples of the present invention were also satisfactory in the results of the corrosion resistance test. Specifically, the rust occurrence was not recognized at all in any of samples (1) to (15). On the other hand, rust was generated in samples (17) and (21), indicating that these samples were inferior to the other samples in the corrosion resistance. It should be noted in this connection that the chromium concentration in each of samples (17) and (21) was lower than 7% by weight, leading to the rust generation.

To reiterate, the hardening temperature for each of samples (1) to (15) was relatively low. In addition, these samples were found to be excellent in the mechanical strength such as the rolling fatigue life characteristics and to exhibit a high corrosion resistance. In other words, samples (1) to (15), which represent the ball-and-roller bearing 1 according to the examples of the present invention, were found to exhibit excellent life characteristics.

The carbon concentration in a surface region of each of samples (1) to (21) is also given in Table 2. The term "surface region" represents a region having a depth, as measured from the surface of each sample, equal to 2% of the diameter of the ball 4. Also, the carbon concentration in the surface region was measured by an emission spectroscopic analysis by dissolving the surface region of each sample in a solvent.

For example, comparing samples (9) and (18), these samples are different in the carbon concentration in the surface region, i.e., the carbon concentration in the surface region of the former falls within a range of between 0.9 and 1.5% by weight, while that of the latter is less than 0.9% by weight. It should also be noted that each of samples (1) to (15) according to the examples of the present invention exhibits a surface hardness higher than that of sample (18) and a $L_{10}$ life longer than that of sample (18). The experimental data clearly support that a sufficiently high surface hardness can be obtained by setting the carbon concentration in the surface region at 0.9% by weight or more.

Likewise, samples (9) and (19) are different in the carbon concentration in the surface region, i.e., that of former falls within a range of between 0.9 and 1.5% by weight while the latter higher than 1.5% by weight. Sample (19) is certainly substantially equal in its surface hardness to samples (1) to (15). However, sample (19) is markedly inferior in its $L_{10}$ life to samples (1) to (15). It should be noted in this connection that, since the carbon concentration in the surface region exceeds 1.5% by weight in sample (19), a coarse mesh-like carbide structure is formed in the surface region so as to give rise to the poor $L_{10}$ life. To be more specific, the mesh-like carbide structure acts as an origin of crack occurrence so as to have markedly shortened the life of sample (19).

It should be noted that sample (16) falls within the scope defined in the present invention, except that the chromium concentration alone fails to fall within the range specified in the present invention. To be more specific, the chromium concentration in any of samples (1) to (15) according to the embodiment of the present invention falls within a range of between 7.0 and 11.0% by weight, whereas, the chromium concentration of sample (16) is 12.8% by weight, which exceeds the upper limit of 11.0% by weight specified in the present invention. As result, sample (16), which certainly exhibits a sufficiently high surface hardness, tends to incur seizing and has a rolling fatigue life shorter than that of any of samples (1) to (15).

The relationship between the surface hardness and the molybdenum concentration in the case hardened bearing steel and the relationship between the surface hardness and the cobalt concentration in the case hardened bearing steel were examined by the method described in the following.

Figure 6:
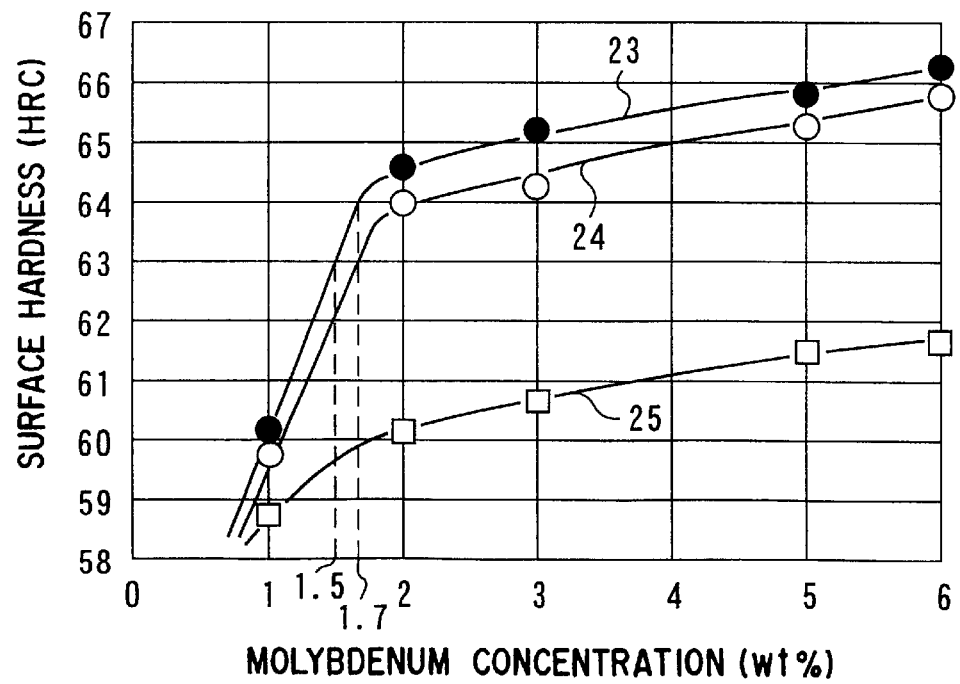
FIG. 6 is a graph showing the relationship between the molybdenum concentration in the case hardened bearing steel and the surface hardness.

Specifically, the relationship between the cobalt concentration and surface hardness was examined first by changing the cobalt concentration in the case hardened bearing steel, with the concentrations of the other components set constant. FIG. 5 is a graph showing the result. Then, the relationship between the molybdenum concentration and surface hardness was examined by changing the molybdenum concentration in the case hardened bearing steel, with the concentrations of the other components set constant. FIG. 6 is a graph showing the result.

In the graph shown in FIG. 5, the cobalt concentration is plotted on the abscissa, with the surface hardness (HRC) being plotted on the ordinate. Also, in the graph shown in FIG. 6, the molybdenum concentration is plotted on the abscissa, with the surface hardness (HRC) being plotted on the ordinate.

A curve 20 shown in FIG. 5 covers the case where the case hardened bearing steel contained 5 to 6% by weight of molybdenum, 0.2 to 0.4% by weight of silicon, 0.2 to 0.5% by weight of manganese, 7 to 8% by weight of chromium, 0 to 0.1% by weight of vanadium, 0.5 to 1.5% by weight of nickel, and varied amounts of cobalt, and where the carbon concentration in the surface region of the case hardened bearing steel was set at 0.9 to 1.5% by weight. A curve 21 shown in FIG. 5 covers the case substantially equal to the case denoted by the curve 20, except that the case hardened bearing steel contained 2 to 3% by weight of molybdenum and 10 to 11% by weight of chromium. Further, a curve 22 shown in FIG. 5 covers the case substantially equal to the case denoted by the curve 21, except that the case hardened bearing steel contained 1% by weight of molybdenum.

A curve 23 shown in FIG. 6 covers the case where the case hardened bearing steel contained 5 to 6% by weight of molybdenum, 7 to 8% by weight of cobalt, 0.3 to 0.4% by weight of silicon, 0.3 to 0.5% by weight of manganese, 10 to 11% by weight of chromium, 0.1 to 0.2% by weight of vanadium, 1 to 2% by weight of nickel, and varied amounts of molybdenum, and where the carbon concentration in the surface region of the case hardened bearing steel was set at 0.9 to 1.5% by weight. A curve 24 shown in FIG. 6 covers the case substantially equal to the case denoted by the curve 23, except that the case hardened bearing steel contained 2 to 3% by weight of cobalt and 7 to 8% by weight of chromium. Further, a curve 25 shown in FIG. 6 covers the case substantially equal to the case denoted by the curve 23, except that the case hardened bearing steel contained 0% by weight of cobalt and 9 to 10% by weight of chromium.

In a ball-and-roller bearing used under a high temperature and at a high rotating speed like a ball-and-roller bearing used for supporting a rotary shaft in an engine of an aircraft, a very high demand is directed to the rolling fatigue life characteristics. In general, the rolling fatigue life of a ball-and-roller bearing is deeply related to the surface hardness of the bearing member. In order to obtain satisfactory rolling fatigue life characteristics in a ball-and-roller bearing used in, for example, an engine of an aircraft, it is said that the surface hardness (HRC) of at least 63, preferably at least 64, is required.

Where the molybdenum concentration in the case hardened bearing steel is set at 1% by weight, it is impossible to obtain the surface hardness (HRC) of at least 63 by changing the cobalt concentration, as shown in FIG. 5. On the other hand, where the molybdenum concentration is set at 2% by weight or more, the surface hardness (HRC) is increased with increase in the cobalt concentration.

As shown in FIG. 5, where the case hardened bearing steel has a composition described previously in conjunction with curve 20, the surface hardness (HRC) can be made 63 or more by setting the cobalt concentration at 0.5% by weight or more and can be made 64 or more by setting the cobalt concentration at 1.0% by weight or more. On the other hand, where the case hardened bearing steel has a composition described previously in conjunction with curve 21, the surface hardness (HRC) can be made 63 or more by setting the cobalt concentration at 0.7% by weight or more and can be made 64 or more by setting the cobalt concentration at 1.5% by weight or more.

Comparing curves 20 to 22 in FIG. 5, it is clearly shown that curves 20 and 21 widely differ from curve 22 in the surface hardness. However, a large difference in the surface hardness is not recognized between curves 20 and 21. In other words, it is impossible to improve markedly the surface hardness by increasing the molybdenum concentration in the case hardened bearing steel to exceed 6.0% by weight. It should also be noted that molybdenum is relatively costly. In addition, the toughness is adversely affected in the case of excessively adding molybdenum. It follows that the increase in the manufacturing cost can be suppressed and the reduction in the toughness can be prevented by setting the molybdenum concentration in the case hardened bearing steel at 6.0% by weight or less.

Next, curves 23 to 25 shown in FIG. 6 are compared. As is apparent from the curves 23 to 25, the surface hardness can be increased by increasing the molybdenum concentration in the case hardened bearing steel. However, where the case hardened bearing steel does not contain cobalt, it is impossible to obtain a sufficiently high surface hardness even if the molybdenum concentration is increased up to 6% by weight. On the other hand, where the cobalt concentration in the case hardened bearing steel is set at 2% by weight or more, the surface hardness can be markedly improved by the addition of only a small amount of molybdenum.

As shown in FIG. 6, where the case hardened bearing steel has a composition described previously in conjunction with curve 23, the surface hardness (HRC) can be made 63 or more by setting the molybdenum concentration at 1.5% by weight or more and can be made 64 or more by setting the molybdenum concentration at 1.7% by weight or more. On the other hand, where the case hardened bearing steel has a composition described previously in conjunction with curve 24, the surface hardness (HRC) can be made 63 or more by setting the molybdenum concentration at 1.7% by weight or more and can be made 64 or more by setting the cobalt concentration at 2.0% by weight or more.

Also, where the cobalt concentration in the case hardened bearing steel is set at 2% by weight or more, the surface hardness (HRC) of 64 or more can be obtained with a high stability by setting the molybdenum concentration at 2% by weight or more, as apparent from FIG. 6.

Comparing curves 23 to 25 in FIG. 6, it is clearly shown that curves 23 and 24 widely differ from curve 25 in the surface hardness. However, a large difference in the surface hardness is not recognized between curves 23 and 24. In other words, it is impossible to improve markedly the surface hardness by increasing the cobalt concentration in the case hardened bearing steel to exceed 8.0% by weight. It should also be noted that cobalt is relatively costly. In addition, the toughness is adversely affected in the case of excessively adding cobalt. It follows that the increase in the manufacturing cost can be suppressed and the reduction in the toughness can be prevented by setting the cobalt concentration in the case hardened bearing steel at 8.0% by weight or less.

Figure 7:
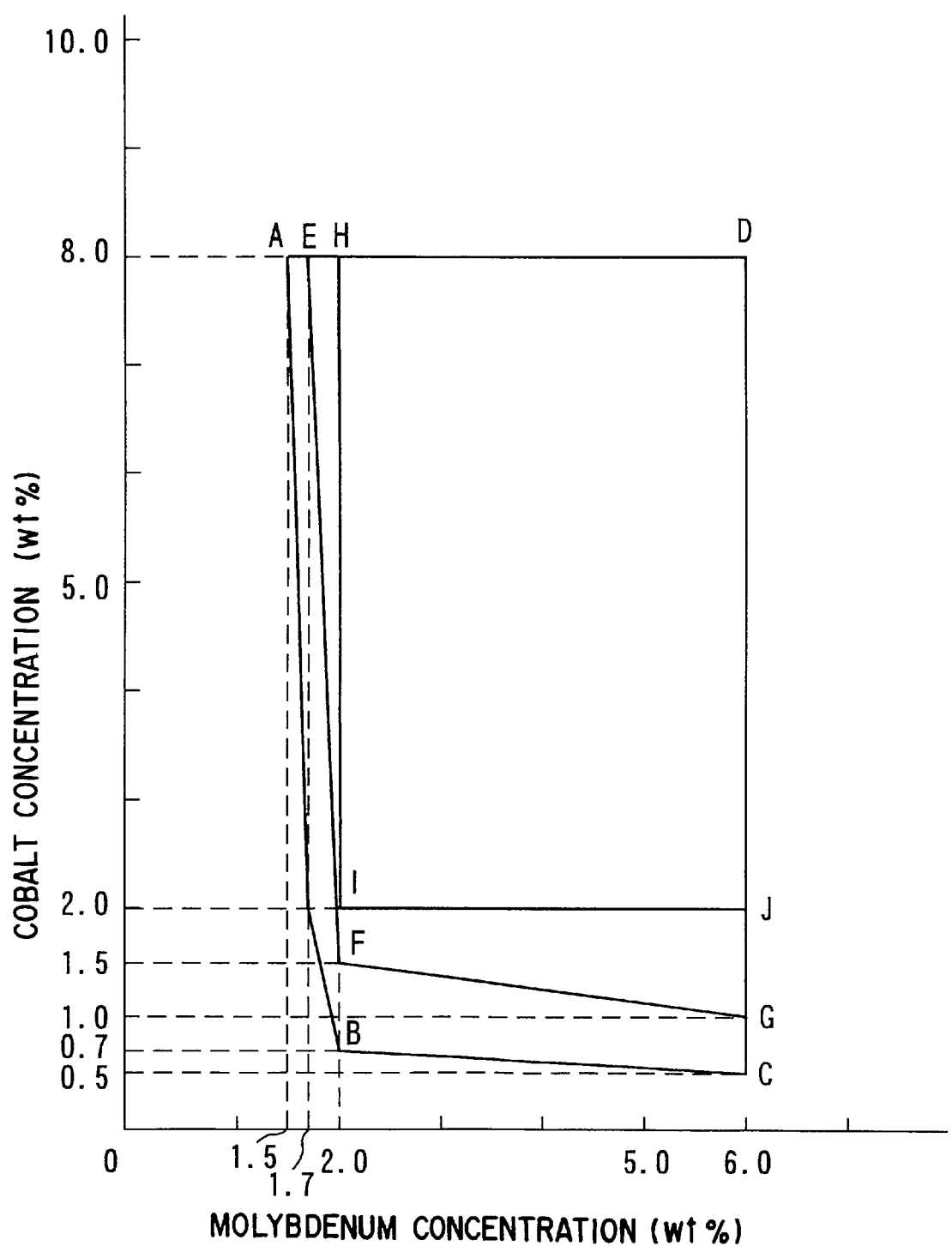
FIG. 7 is a graph showing the relationship among the molybdenum concentration and the cobalt concentration in the case hardened bearing steel and the surface hardness.

The relationship among the molybdenum concentration and the cobalt concentration in the case hardened bearing steel and the surface hardness was studied on the basis of the experimental data given in FIGS. 5 and 6, with the result as shown in a graph of FIG. 7. In the graph of FIG. 7, the molybdenum concentration is plotted on the abscissa, with the cobalt concentration being plotted on the ordinate. It should be noted that the concentrations of the other components constituting the case hardened bearing steel fell within the ranges defined in the present invention.

In the graph of FIG. 7, the region surrounded by A-B-C-D denotes a range within which the surface hardness (HRC) of at least 63 can be obtained. The region surrounded by E-F-G-D denotes a range within which the surface hardness (HRC) of at least 64 can be obtained. Further, the region surrounded by H-I-J-D denotes a range within which the surface hardness (HRC) of a further higher level can be obtained. It follows that the molybdenum concentration and the cobalt concentration required for obtaining a sufficiently high surface hardness can be determined by using the graph of FIG. 7.

As described above, any of the ball-and-roller bearings according to the examples of the present invention exhibits a high corrosion resistance and excellent rolling fatigue life characteristics. It follows that each of the ball-and-roller bearings according to the examples of the present invention is suitable for use as a ball-and-roller bearing used under the conditions of a high temperature and a high rotating speed like a ball-and-roller bearing used in an engine of an aircraft. For example, the ball-and-roller bearings according to the examples of the present invention can be used even where the dN value is set at about 3,000,000 to 4,000,000 and the temperature is set at about 300° C. to 400° C. Incidentally, the term "dN value" represents the product between the inner diameter (mm) of the inner ring and the number of revolutions per unit time (rpm).

In the examples described above, a cementating treatment was applied to the alloy under vacuum. However, since the cementating treatment is intended to supply carbon required for the secondary hardening to the surface of the alloy, the cementating treatment is not limited to the vacuum cementating treatment. Specifically, the similar effect can be obtained by, for example, a plasma cementating treatment or a carbonitriding treatment.

Also, in the examples described above, a case hardened bearing steel of a predetermined composition is used for forming all of the inner ring, the outer ring, and the rolling bodies. However, it is not absolutely necessary to use the case hardened bearing steel specified in the present invention for forming all of the inner ring, the outer ring, and the rolling bodies. It should be noted that the rolling body is less likely to be exposed to the outer atmosphere than the inner ring and the outer ring and has a size and a surface area smaller than those of the inner ring and the outer ring. It follows that the corrosion problem of the rolling bodies are not so serious. Also, since the rolling body is sized small, the requirement for a high toughness in the inner portion is relatively low in the rolling body. It follows that it is possible to use, for example, a semihice series materials of AISI M50 or M50 NiL for forming the rolling bodies.

It is also possible to use, for example, a ceramic material such as silicon nitride, alumina, or zirconia for forming the rolling bodies. Where the rolling bodies are formed of such a ceramic material, it is possible to improve the heat resistance, the surface hardness and the corrosion resistance.

The mechanical characteristics and the corrosion resistance can be improved even where one or two of the inner ring, the outer ring and the rolling body is formed of the case hardened bearing steel specified in the present invention while forming the remaining member by using another material.

As described above, the present invention provides a ball-and-roller bearing, in which at least one of the inner ring, the outer ring, and the rolling body is formed of a case hardened bearing steel consisting of an alloy of a predetermined composition and having a case hardened layer. It follows that the present invention provides a ball-and-roller bearing excellent in mechanical characteristics and corrosion resistance and a method of manufacturing the same.

What is claimed is:

1. A ball-and-roller bearing which exhibits an excellent corrosion resistance, comprising:

an inner ring;

an outer ring arranged on the co-axis of the inner ring and rotating around the axis relative to the inner ring; and a rolling body interposed between the inner ring and the outer ring and rolling on the inner ring and the outer ring in accordance with rotation of the outer ring relative to the inner ring, wherein at least one member selected from the group consisting of the inner ring, the outer ring, and the rolling body comprises a core member consisting essentially of an alloy consisting essentially of iron, 0.15% by weight or less of carbon, at least one of 0.2 to 1.0% by weight of silicon and 0.2 to 1.5% by weight of manganese, 7.0 to 11.0% by weight of chromium, 1.5 to 6.0% by weight of molybdenum, 0.5 to 8.0% by weight of cobalt, 1.0% by weight or less of vanadium, and 5.0% by weight or less of nickel, and a case hardened layer formed by subjecting a surface region of said core member to a secondary hardening treatment and containing 0.9 to 1.5% by weight of carbon.

2. The ball-and-roller bearing according to claim 1, wherein said alloy contains 0.1 to 1.0% by weight of vanadium and 1.0 to 5.0% by weight of nickel.

3. A method of manufacturing a ball-and-roller bearing which exhibits an excellent corrosion resistance, comprising the steps of:

forming a core member consisting essentially of an alloy consisting essentially of iron, 0.15% by weight or less of carbon, at least one of 0.2 to 1.0% by weight of silicon and 0.2 to 1.5% by weight of manganese, 7.0 to 11.0% by weight of chromium, 1.5 to 6.0% by weight of molybdenum, 0.5 to 8.0% by weight of cobalt, 1.0% by weight or less of vanadium, and 5.0% by weight or less of nickel;

forming a case hardened layer containing 0.9 to 1.5% by weight of carbon in a surface region of said core member by applying to said core member a carbonizing or carbonitriding treatment, a hardening treatment, and a tempering treatment under high temperatures in the order mentioned; and assembling an inner ring, an outer ring and a rolling body such that said inner ring and said outer ring are positioned on the same axis and that said rolling body is interposed between said inner ring and said outer ring, at least one of said inner ring, said outer ring, and said rolling body being formed of said core member having said case hardened layer formed on the surface.

4. The method of manufacturing a ball-and-roller bearing according to claim 3, wherein said alloy comprises 0.1 to 1.0% by weight of vanadium and 1.0 to 5.0% by weight of nickel.

5. The ball-and-roller bearing according to claim 1, wherein said core member contains molybdenum and cobalt in a concentration range surrounded by solid lines A-B, B-C, C-D, and D-A shown in FIG. 7.

6. The ball-and-roller bearing according to claim 2, wherein said core member contains molybdenum and cobalt in a concentration range surrounded by solid lines A-B, B-C, C-D, and D-A shown in FIG. 7.

7. The ball-and-roller bearing according to claim 1, wherein said alloy contains 8.0 to 11.0% by weight of chromium.

8. The method of manufacturing a ball-and-roller bearing according to claim 3, wherein said core member contains molybdenum and cobalt in a concentration range surrounded by solid lines A-B, B-C, C-D, and D-A shown in FIG. 7.

9. The method of manufacturing a ball-and-roller bearing according to claim 4, wherein said core member contains molybdenum and cobalt in a concentration range surrounded by solid lines A-B, B-C, C-D, and D-A shown in FIG. 7.

10. The method of manufacturing a ball-and-roller bearing according to claim 3, wherein said alloy contains 8.0 to 11.0% by weight of chromium.

11. A ball-and-roller bearing which exhibits an excellent corrosion resistance, comprising:

an inner ring;

an outer ring arranged on the co-axis of the inner ring and rotating around the axis relative to the inner ring; and a rolling body interposed between the inner ring and the outer ring and rolling on the inner ring and the outer ring in accordance with rotation of the outer ring relative to the inner ring, wherein at least one member selected from the group consisting of the inner ring, the outer ring, and the rolling body comprises a core member of an alloy comprising of iron, about 0 to 0.15% by weight of carbon, at least one of 0.2 to 1.0% by weight of silicon and 0.2 to 1.5% by weight of manganese, 7.0 to 11.0% by weight of chromium, 1.5 to 6.0% by weight of molybdenum, 0.5 to 8.0% by weight of cobalt, and 1.0 to 5.0% by weight of nickel, and a case hardened layer formed by subjecting a surface region of said core member to a secondary hardening treatment and containing 0.9 to 1.5% by weight of carbon.

* * * * *

UNITED STATES PATENT AND TRADEMARK OFFICE
CERTIFICATE OF CORRECTION

PATENT NO.    : 6,248,186 B1
DATED         : June 19, 2001
INVENTOR(S)   : K. Yamamura et al.

It is certified that error appears in the above-identified patent and that said Letters Patent is hereby corrected as shown below:

<u>Title page,</u>
Item [56], References Cited, insert in appropriate order the following:
-- FOREIGN PATENT DOCUMENTS
   3-82736    4/1991       (JP) --

Signed and Sealed this

Fifth Day of March, 2002

Attest:

JAMES E. ROGAN
*Attesting Officer*     *Director of the United States Patent and Trademark Office*